(12) United States Patent
Thie et al.

(10) Patent No.: US 7,899,770 B2
(45) Date of Patent: Mar. 1, 2011

(54) MULTIPLE CRITERIA DECISION MAKING (MCDM) METHOD FOR MAINTAINING COMPLEX TECHNOLOGY

(75) Inventors: Julia Claire Thie, Worcestershire (GB); Michael Colin Reed, Worcestershire (GB); Michael Darren Chitty, Worcestershire (GB)

(73) Assignee: Qinetiq Limited (GB)

( * ) Notice: Subject to any disclaimer, the term of this patent is extended or adjusted under 35 U.S.C. 154(b) by 748 days.

(21) Appl. No.: 11/908,222

(22) PCT Filed: Mar. 9, 2006

(86) PCT No.: PCT/GB2006/000835
§ 371 (c)(1),
(2), (4) Date: Sep. 10, 2007

(87) PCT Pub. No.: WO2006/095174
PCT Pub. Date: Sep. 14, 2006

(65) Prior Publication Data
US 2008/0168015 A1    Jul. 10, 2008

(30) Foreign Application Priority Data
Mar. 11, 2005  (GB) .................................. 0505047.1

(51) Int. Cl.
*G06N 5/00* (2006.01)
(52) U.S. Cl. .......................................... 706/46; 706/45
(58) Field of Classification Search .................... 706/46, 706/45
See application file for complete search history.

(56) References Cited

U.S. PATENT DOCUMENTS 5,133,046 A   7/1992  Kaplan
5,798,939 A   8/1998  Ochoa

FOREIGN PATENT DOCUMENTS

EP        0 509 817 A1    4/1992

OTHER PUBLICATIONS

Schwarz, Pareto Bayesian Optimization Algorithm for the multiobjective 0/1 Knapsack Problem, Brno University of Technology, 2001, pp. 1-6.*

* cited by examiner

*Primary Examiner* — Wilbert L Starks, Jr.
(74) *Attorney, Agent, or Firm* — McDonnell Boehnen Hulbert & Berghoff LLP

(57) ABSTRACT

The invention relates to a method of multiple criteria decision making. In particular, a method of maintaining a complex article is described that includes the steps of; (a) taking a set of options for replacing each of a plurality of components of the complex article, (b) identifying an optimum solution set from the set of possible replacement options of step (a) that best satisfies a plurality of criteria and (c) implementing an optimum solution of the optimum solution set. The step of identifying an optimum solution set comprises the step of evaluating a plurality of potential solutions from the set of possible options defined in step (a) against the plurality of criteria. The criteria values for potential solutions comprise probability functions and the step of evaluating a potential solution comprises the step of calculating a measure of effectiveness (MOE) of the potential solution from the probability function of each criterion value and at least one associated user function defining the acceptability of said criterion. The use of optimisation processes, such as evolutionary algorithms (including genetic algorithms) and dynamic programming are also disclosed. The application of the process to various alternative problems is also outlined.

25 Claims, 5 Drawing Sheets

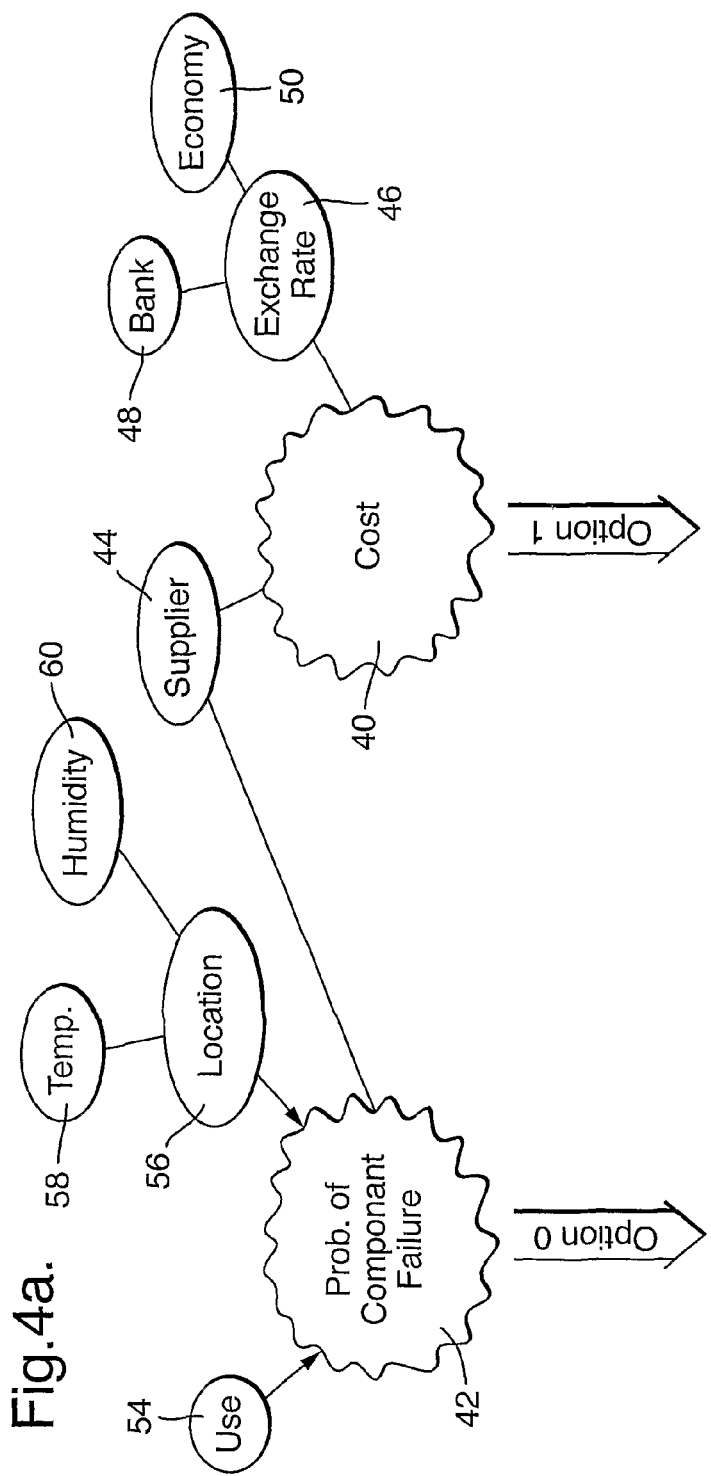
Fig. 4a.
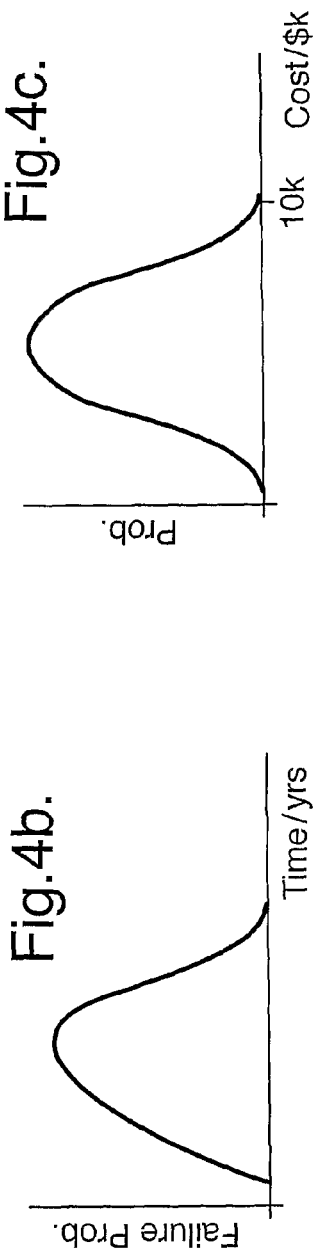
Fig. 4b.
Fig. 4c.

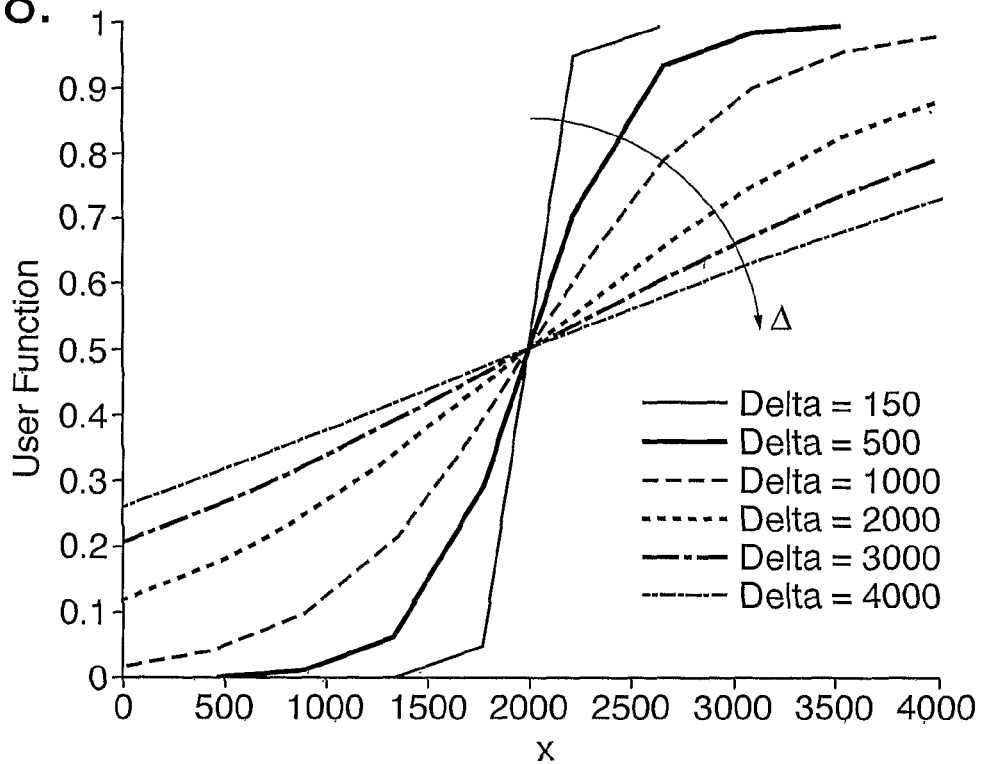
Fig.8. Effect of varying delta on Benefit User Function
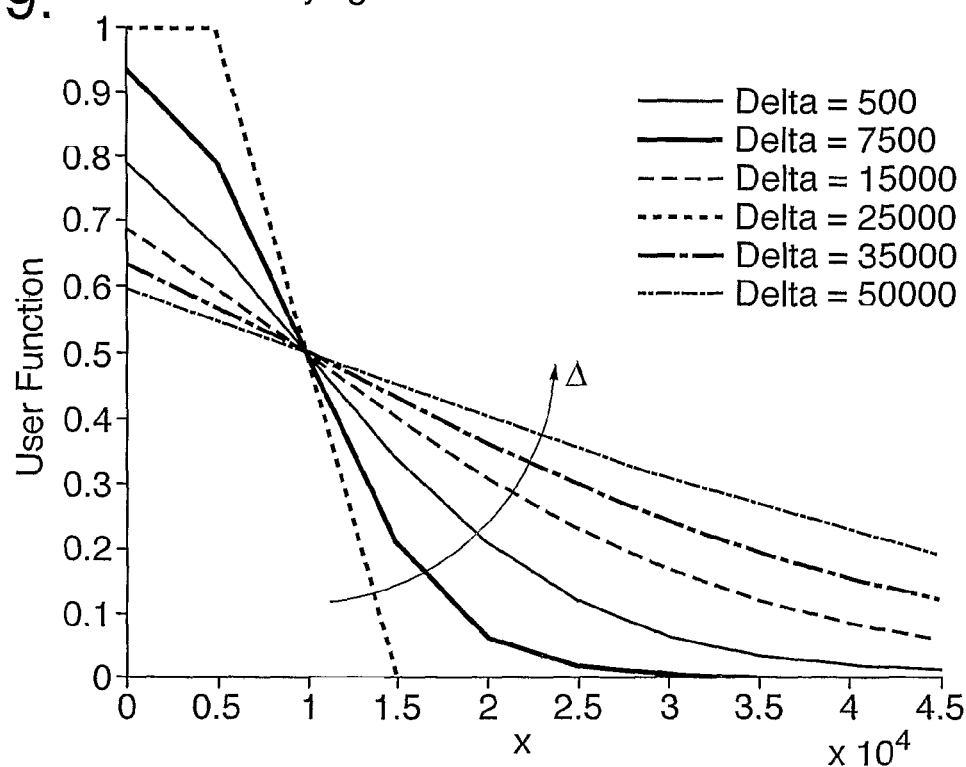
Fig.9. Effect of varying delta on the Cost User Function

MULTIPLE CRITERIA DECISION MAKING (MCDM) METHOD FOR MAINTAINING COMPLEX TECHNOLOGY

BACKGROUND OF THE INVENTION (1) Field of the Invention

The present invention relates to a method for multiple criteria decision making (MCDM). More particularly, the invention relates to an MCDM method that is suitable for maintaining a complex article that comprises multiple components.

(2) Description of the Art

There are many situations that require the best solution to be found to a multi-objective, often termed multi-criteria, problem. Examples range from financial and resource planning problems to complex technical maintenance problems. The various criteria are often conflicting and solutions that provide an acceptable trade-off are sought.

A variety of techniques are known for finding solutions to complex multi-criteria problems. One known approach is to combine the various objectives, possibly applying different weightings to different criteria, to form an aggregate problem. An optimisation process can then be applied to find the best solutions to the aggregate problem. Techniques of this type are often termed Multiple Attribute Value Theory or Multiple Attribute Utility Theory (MAVT/MAUT) and are described in more detail by R. Keeny and H. Raiffa in the book "Decisions with Multiple Objectives", Wiley, 1976. However, approaches of this type place a high reliance on the particular weightings that are used when combining the criteria and failure to meet certain criteria can be masked by meeting a number of the other criteria very well.

True multi-criteria optimisation techniques are also known in which each criterion is considered separately. In such techniques, optimal solutions are sought that respect all the separate criteria. The ideal solution to such multi-criteria problems is the so-called Pareto optimal set; this is a set of solutions each of which are not dominated by the others in terms of all the criteria. Evolutionary algorithms (EAs), which include genetic algorithms (GAs), are examples of well known techniques that are particularly suited for true multi-criteria optimisation.

Existing MCDM techniques of the type described above are inherently incapable of solving problems in which the various criteria have an associated uncertainty. To account for any uncertainty in the criteria, it is necessary to form a so-called decision tree that provides a hierarchical depiction of decisions at different levels. Typically, such decision trees are formed using bounding scenarios for future events; for example the best and worst possible scenarios could be considered. Known MCDM techniques of the type described above can then be applied to the various branches of the decision tree to produce scores for each possible consequence. Although the formation of a decision tree can deal with some degree of uncertainty, such a technique can be seen to be extremely complex when there are multiple criteria having high levels of uncertainty.

A number of techniques are known for describing criteria using probabilistic values. For example, it is possible to use Bayesian belief networks (BBNs) as described in "Probabilistic Reasoning in Intelligent Systems: Networks of Plausible Inference", by J. Pearl, Morgan Kauffman, San Mateo, Calif. 1988. However, a skilled person would appreciate that the probabilistic values generated for each criteria would have to be converted to single values before any of the known MCDM evaluation techniques described above could be applied thereto. Conversion of the probabilistic criteria to singular values would thus remove any advantage associated with describing criteria probabilistically using a BBN.

An example of a complex technical problem in which criteria can be described using probabilistic values is the problem of ensuring that a complex piece of machinery, such as a train, aircraft or complex micro-electronic device, is maintained so as to continually meet certain technical specifications (e.g. performance or safety criteria) throughout its lifetime. In particular, such a problem may involve assessing potential options for dealing with components that become obsolete during the complex article's lifetime. In such an example, there may be many potential options for dealing with each obsolete component and it is thus an extremely complex task to find and implement the suite of component replacement options that provide the best trade-off against the necessary criteria at a system, rather than component, level.

SUMMARY OF THE INVENTION

It is thus an object of the present invention to provide a decision malting process that can be applied to solving problems in which the criteria values are probabilistic. It is a further object of the invention to provide an improved method for multiple criteria decision making (MCDM). It is a still further object of the invention to provide a method of maintaining/repairing a complex article using an MCDM process.

According to a first aspect of the present invention a method for maintaining a complex article comprises the steps of; (a) taking a set of options for replacing each of a plurality of components of the complex article, (b) identifying an optimum solution set from the set of possible replacement options of step (a) that best satisfies a plurality of criteria, the step of identifying an optimum solution set comprising the step of evaluating a plurality of potential solutions from the set of possible options defined in step (a) against the plurality of criteria, and (c) implementing an optimum solution of the optimum solution set, wherein the criteria values for potential solutions comprise probability functions and the step of evaluating a potential solution comprises the step of calculating a measure of effectiveness (MOE) of the potential solution from the probability function of each criterion value and at least one associated user function defining the acceptability of said criterion.

The present invention thus provides an MCDM based process that allows an available replacement option (e.g. redesign, repair, replace) to be selected for each component of the complex article that best satisfies a plurality of criteria. Maintaining the complex article can thus be considered to be a complex problem having multiple objectives and the MOE based method of the present invention provides an improved way of finding the best, i.e. optimal, overall solution or solutions to that maintenance problem from the various potential combinations of component replacement options.

The present invention can thus be seen to solve the technical problem of how to maintain a complex article (e.g. an aircraft or complex electronic device) in an acceptable state of repair. In other words, the invention provides a method of ensuring that certain technical criteria (e.g. performance, safety, reliability etc.) are met throughout the lifetime of the complex article by selecting the most appropriate options for replacing, for example, obsolete components. Furthermore, the method can also be used to ensure that the various technical criteria are met in the most cost-effective manner possible.

Unlike the prior art MCDM techniques described above, the method of the present invention assesses potential solutions to the complex multiple component replacement problem using measure of effectiveness (MOE) theory. MOE theory can be applied to any data type and it can thus deal with system characteristics that are expressed as probability functions. The ability to base the MCDM process on criteria values expressed probabilistically enables models of the system, such as Bayesian belief networks, to be used that allow uncertainty to be associated with the criteria values generated for each replacement option. The use of probabilistic criteria values when assessing potential solutions can be seen to have significant advantages over decision tree based MCDM techniques of the prior art that can only handle very limited levels of uncertainty before failing. Furthermore, MOEs provide a direct measure of how well the probabilistic criteria values match the users' requirements and the MOEs for multiple criteria can thus be readily combined. Unlike prior art techniques, when combining MOEs it is not essential to use an aggregation step in which the importance of each criteria is assigned a relative weight by a user. However, a weighted sum of MOEs for different criteria could be performed if required.

It should also be noted that the complex article comprises, and does not necessarily consist exclusively of, the aforementioned plurality of components. The article may thus comprise additional components that are not considered in the analysis; for example, highly reliable, non-critical or easily replaceable components (e.g. commercial-off-the-shelf, COTS, components) could be excluded from the maintenance/repair analysis. Furthermore, the step (c) of implementing an optimum solution from the calculated optimum solution set may comprise adopting the various replacement options that are contained in the chosen optimum solution at certain points in the future. For example, a replacement option contained in the implemented solution may be to upgrade a certain component in several years time.

In accordance with the terminology that is commonplace to those skilled in the art, herein the value returned when comparing an option to a criterion shall be termed a criterion value. Consider, for example, assessing an option against a cost criteria. In such an example, the criterion value provided by such an assessment would be a probability function (e.g. a probability density function of the type shown in FIG. 4c) of the likely cost of the particular option. The probability function may take the form of a continuous probability density function (PDF) or a histogram.

Advantageously, each option for replacing a component is assessed against a plurality of criteria. The plurality of criteria may comprise at least one cost criteria and at least one benefit criteria. For example, each option for replacing an obsolete electronic component on the circuit board of a flight control system may be assessed in terms of reliability, life-time, energy consumption, purchase cost and running cost criteria. The reliability and life-time would be benefit criteria that need to be maximised and the purchase cost, running cost and energy consumption criteria would be cost criteria that would typically need to be minimised.

Advantageously, the method comprises the step of using a Bayesian Belief Network (BBN) to model said plurality of criteria, said BBN being arranged to provide the criteria values (i.e. probabilistic criteria values) for said potential solutions. A BBN is preferred as it allows complex systems to be modelled in which the various criteria may be interdependent and have high levels of uncertainty associated therewith. Although BBNs are known, their use in MCDM has previously been discounted because prior art MCDM techniques are unable to handle criteria with probabilistic values.

Preferably, criteria values are determined by the BBN for each of the component replacement options prior to step (b).

In other words, the BBN establishes a probability function (i.e. a criterion value) for each criterion for each option. It should also be noted that, in the case of dependence, joint probability functions for several criteria could be used. Measures of effectiveness are then calculated for potential solutions using the appropriate pre-determined probability functions. Alternatively, the criterion value for an option could be determined as and when required.

Advantageously, the step of calculating a measure of effectiveness (MOE) comprises the step of taking at least one predetermined user function for each criterion. The user functions defines the acceptability to a user of a given criterion value (e.g. a cost or a benefit). An MOE for a criterion is thus formed from (a) the probability function for that criterion and (b) the user function for that criterion.

In the case of N different user requirements, each criteria may have N user functions associated therewith. The step of calculating a measure of effectiveness (MOE) may thus comprise the step of taking two or more predetermined user functions for each criterion. A MOE may then be generated for each user and/or an overall MOE for both users could be calculated.

Advantageously, the step of calculating a measure of effectiveness (MOE) of a potential solution comprises the step of calculating a single, overall, MOE value. In other words, a single MOE value is determined for each potential solution (i.e. each suite of potential replacement options) by forming an arithmetic mean of the MOE values associated with each criteria. In such a case, the optimum solution set may comprise a single optimum solution having the best MOE score or a set of N solutions having the best MOE scores. As described in more detail below, taking an arithmetic mean of a number of MOE values produces another MOE. However, it should be noted that a simple sum of MOE values could alternatively be used to compare solutions in which the same number of MOE values are combined. Such a sum of MOE values would typically not, strictly, be termed an MOE as it would not take values only in the range of 0 to 1.

In addition to, or instead of, producing an overall MOE for each potential solution, the step of calculating a measure of effectiveness (MOE) of a potential solution may comprise the step of calculating at least first and second MOE values. In other words, the various MOE values derived for each criteria of a potential solution can be combined into one or more MOEs. The first MOE may relate to, say, cost and the second MOE may relate to a benefit. The optimal solution set may thus comprise a plurality of optimal solutions that have different cost/benefit tradeoffs. The optimum solution set of step (b) may comprise the Pareto set of optimal solutions. In this case, a decision maker may select an optimal solution from the Pareto set that provides the desired trade-off. The selected solution is then implemented.

The formation of appropriate user functions, the ways in which MOEs can be combined and the concept of a Pareto set of optimal solutions are described in more detail below.

Advantageously, step (b) comprises the step of using an optimisation process to determine the optimum solution set. For example, the optimisation process may comprise the step of using an Evolutionary Algorithm (EA). The EA may conveniently comprise a genetic algorithm (GA). In such a case, the fitness function of a solution proposed by the EA/GA would be said MOE value(s). Alternatively, the optimisation process may comprise the step of using a dynamic programming technique. More detail about appropriate optimisation techniques is given below. Although an optimisation process is preferred for computational efficiency, an enumeration process could alternatively be used in which an MOE is calculated for every possible combination of replacement options.

Preferably, the set of options for replacing each of a plurality of components of the complex article comprises options for dealing with component obsolescence arisings (OAs). In this manner, it can be assured that any OAs notified by component manufacturers by the issuance of last time buys (LTBs) can be managed by selecting the most appropriate replacement option.

A complex article will typically comprise numerous components; for example, more than ten, or more than one hundred, or more than one thousand components. The possible options taken in step (a) may thus be derived from a hierarchical description of the components forming the complex article. A hierarchical structure may comprise describing components in terms of systems (e.g. flight control system, engines, navigation system) and each system may comprise sub-systems (e.g. the flight control system may comprise a computer) that comprise sub-components (e.g. the computer may comprises a memory board, a power supply, a processor board). Furthermore, each sub-component would then comprise further components (memory chips, processor chips, fuses etc.). Any OA may thus affect one or more systems, sub-systems, sub-components or components etc. Hence the options taken in step (a) for resolving an OA may comprise replacements at any level within the hierarchy; e.g. options for dealing with an obsolete processor chip may include replacing the processor chip, the processor board, the computer or the entire flight control system. Each component may thus have more than two, more than three, more than five or more than ten possible replacement options. It can thus be seen that in a complex system a vast number of potential solutions for resolving OAs are possible.

It should be noted that the method may be repeated throughout the lifetime of the article. The method may be repeated periodically (e.g. every month, every quarter, every six months, every year etc.) or when the component replacement options on which the previous application of the method were based change. For example, the method could be run in the event of new OAs (e.g. the issuance of LTBs) or when more information is gained on the reliability or performance of components.

Preferably, the method is applied to maintain a complex article at a desired operational performance level. In other words, the method allows a certain technical specification to be maintained.

Advantageously, step (a) and/or step (b) of the method are implemented using a suitably programmed computer.

According to a second aspect of the invention, a computer program is provided that comprises instructions for causing a device (e.g. a computer) to execute a method comprising the steps of; (a) taking a set of options for replacing each of a plurality of components of a complex article, (b) identifying an optimum solution set from the set of possible replacement options of step (a) that best satisfies a plurality of criteria, the step of identifying an optimum solution set comprising the step of evaluating a plurality of potential solutions from the set of possible options defined in step (a) against the plurality of criteria, and (c) providing an output that lists the solution(s) contained in the optimum solution set identified in step (b), wherein the criteria values for potential solutions comprise probability functions and the step of evaluating a potential solution comprises the step of calculating a measure of effectiveness (MOE) of the potential solution from the probability function of each criterion value and at least one associated user function defining the acceptability of said criterion. Advantageously, step (b) comprises the step of using an optimisation process.

A computer readable medium may be provided having stored therein said computer program. A computer programmed so as to execute the computer program may also be provided.

The method described above can be seen to solve the technical problem of how to maintain a complex article. However, it is also possible to use an analogous method for solving any multi-criteria problem. Consequently, according to a further aspect of the invention, a method of solving a complex problem to satisfy a plurality of criteria is provided, the method comprising the steps of; (i) taking a potential solution to the problem, (ii) assessing the potential solution to the problem against the plurality of criteria to derive criteria values, and (iii) calculating a measure of effectiveness (MOE) of said potential solution from said criteria values, wherein step (ii) comprises the use of probabilistic criteria values. Advantageously, the method comprises an optimisation step to iteratively repeat steps (i) to (ii) to derive an optimum solution set based on the calculated measures of effectiveness. Preferably, the calculation of a measure of effectiveness (MOE) of step (iii) comprises the step of taking a user function that defines the acceptability of each of the criteria.

Advantageously, the method is applied to at least one of financial planning, resource management, function approximation, investment, project prioritisation, capital/revenue budgeting, sales territory organisation and negotiations. A computer readable medium may also be provided having stored therein instructions for causing a device to execute the method. A computer that is suitably programmed to execute the method may also be provided.

DESCRIPTION OF THE FIGURES

The invention will now be described, by way of example only, with reference to the following drawings in which;

FIG. 4 is a schematic illustration of a Bayesian belief network, FIG. 8 shows the effect of changing $\Delta$ on the benefit user function for a seven component, six board, obsolescence problem, and FIG. 9 shows the effect of changing $\Delta$ on the cost user function for the seven component six board obsolescence problem.

DESCRIPTION OF A PREFERRED EMBODIMENT

Figure 1:
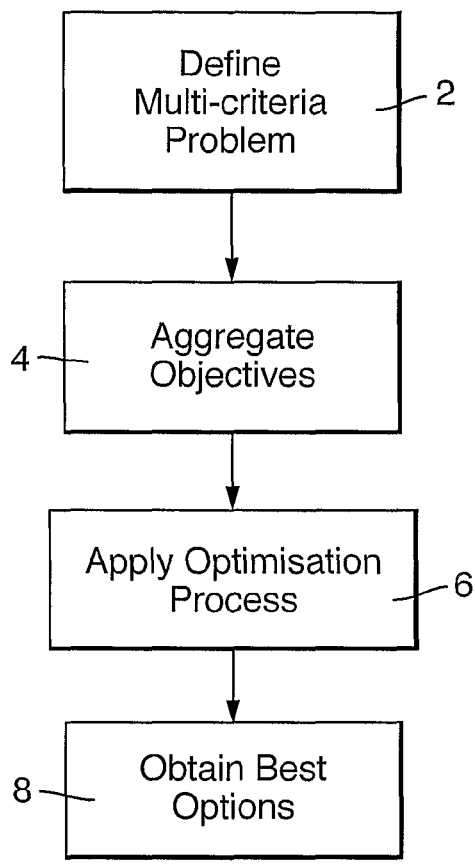
FIG. 1 is a flow chart illustrating a prior art MCDM process.

Referring to FIG. 1, a prior art multi-criteria decision making (MCDM) process is shown.

The initial step 2 of the prior art MCDM process is to define a multi-criteria, also termed multi-objective, problem. A multi-criteria problem is simply a problem in which there is more than one objective to optimise against (e.g. costs and benefits). It would be appreciated by the skilled person that there are many types of technical and non-technical problems that would fall into the multi-criteria category. For example, scheduling, resource management, function approximation, planning and maintaining complex articles, such as aircraft and the like, in an acceptable state of repair.

Once the multiple criteria have been established, an aggregation step 4 is performed to transform the multi-objective problem into a problem having a single output value that reflects how well the various criteria have been met. Typically step 4 is performed by weighting the criteria (i.e. objectives) according to their relative importance and thus often comprises forming a weighted sum of the objective functions. This technique is referred to as Multiple Attribute Value Theory or Multiple Attribute Utility Theory (MAVT/MAUT) and has been described previously by R. Keeny and H. Raiffa (ibid).

Following the aggregation step 4 an optimisation step 6 is performed. The optimisation step 6 can employ any one of a number of well known optimisation techniques to find the best (i.e. optimal) solution to the aggregate problem defined in step 4. The output of the optimisation step 6 is thus a list 8 of the best options that are available for solving the aggregate problem. However, the use of an aggregate problem in prior art methods of this type place a high reliance on the particular weightings that are used when combining the criteria. It has also been found that failure to meet certain criteria can be masked by meeting a number of other criteria very well.

Figure 2:
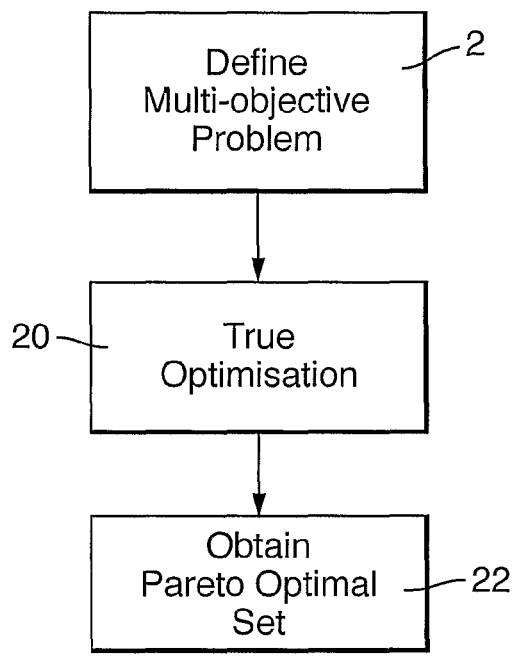
FIG. 2 is a flow chart illustrating a prior art true multi-objective MCDM process.

Referring to FIG. 2, a further prior art MCDM method is shown. In common with the process described with reference to FIG. 1, the method illustrated in FIG. 2 comprises an initial step 2 of defining a multi-objective problem. Once the multi-objective problem has been established, a true multi-objective optimisation step 20 is performed.

The true optimisation step 20 does not aggregate the various criteria but instead keeps them separate and seeks a true multi-objective solution to the problem. Keeping the multiple criteria separate in this manner means that finding an optimal solution to the problem is much harder than solving an aggregated problem in the manner described with reference to FIG. 1. This is because an optimal solution must respect all the separate criteria. Furthermore, the criteria (e.g. cost and benefit) are often conflicting and a solution that provides an acceptable trade-off must be sought.

The optimal solution to any true multi-objective problem is the so-called Pareto optimal set. The Pareto optimal set is a set of solutions each of which are not dominated by the others in terms of all the criteria/objectives. The result of the optimisation step 20 is thus a list of optimal solutions 22 (ideally the Pareto optimal set) that can be presented to a decision maker to make the final choice that provides the desired trade-off.

It should be noted that Evolutionary Algorithms (EAs), which include genetic algorithms (GAs), have previously been found to be particularly suitable for use in the true optimisation step 20. This is because EAs maintain a population of potential solutions at each iteration and hence can be used to find multiple trade-off solutions.

Figure 3:
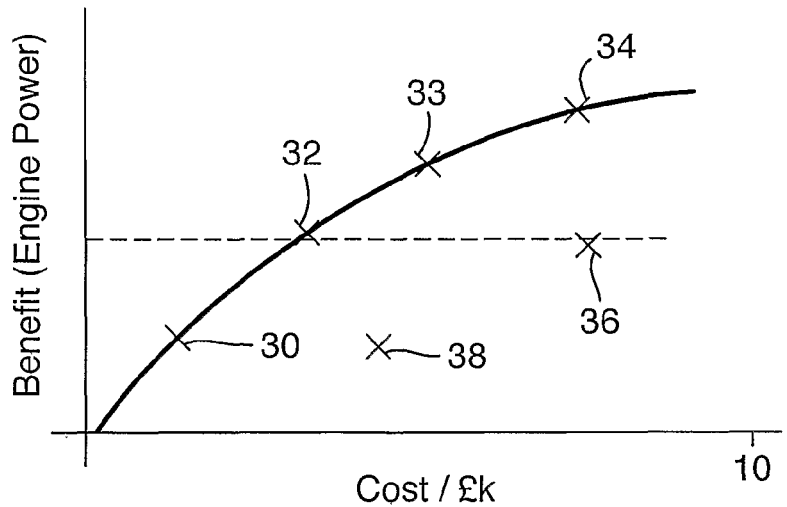
FIG. 3 illustrates a number of solutions to a multi-objective problem.

Referring now to FIG. 3, solutions to a very simple two criteria (cost vs engine power) problem that may be encountered when purchasing a car are illustrated. A number of optimal solutions forming the Pareto optimal set (indicated by crosses 30, 32, 33 and 34) and a number of non-optimal solutions (indicated by crosses 36 and 38) are shown. Only the optimal solutions are presented to the decision maker; i.e. option 36 is not an optimal solution as it offers the same benefit (i.e. engine power) as option 32 but for a higher cost.

In many situations, multiple additional criteria will obviously be involved when formulating the problem. In the above example, other criteria may include, for example, car reliability, running costs, maintenance costs, expected lifetime etc. In such a case, the Pareto set would be a multi-dimensional set of optimal solutions to the problem from which the purchasing decision can be made.

It is important to note that the examples described above with reference to FIGS. 1 to 3 assume that there is no uncertainty associated with the options. For example, it assumes that the cost and engine power of each car used in the simple example described with reference to FIG. 3 are point values (i.e. single, invariant, values). However, in reality, there may be some uncertainty associated with some, or all, of the criteria that define the problem. For example, the cost of the car may depend on the prevailing exchange rate and/or the dealership from which the car is purchased.

In order to cope with uncertainty about future events, it is known to create a so-called decision tree to provide a hierarchical depiction of decisions at different levels. The decision tree displays the consequences at the leaves (end nodes) and then utilises MCDA to create single scores for each consequence. These are then filtered back through the tree and result in a probability weighted score providing a clear preference score for each option.

Although decision trees provide a simple way to deal with small levels of uncertainty, if there is considerable uncertainty about future events then trying to account for every possibility in the decision tree would make it unmanageable. In this case, it is known to create bounding scenarios for these future events; for example, the worst possibility and the best possibility scenarios could be considered.

Once a decision tree has been constructed, multi-criteria decision analysis (MCDA) can be carried out assuming each scenario (e.g. best and worst) and the trees created by each analysis can be merged into one tree at the highest level. Each "sub-tree" under each possible scenario would thus have the same criteria associated with it as the others. The scenarios at the top level can also be weighted as to the likelihood of them occurring and sensitivity analysis can be performed to see the effect on the ranking of the different options. Of course, uncertainty may only affect one or two of the criteria in which case it may be better to simply model this outside the tree and then supply expected values to the tree.

As an example, consider the instance of there being uncertainty about the number of people who will be affected by the noise levels of a new airport terminal. In such a case, the minimum, most likely and maximum possible amount of people affected could be estimated and a triangular probability distribution built. The average of the three values can then be fed back into the tree and, if sensitivity analysis uncovers that this score has a crucial effect on the outcome, further modelling can be carried out to verify the figure more precisely. However, it can be seen that if there are many criteria that have a high degree of associated uncertainty the formation of an appropriate decision tree can become a very complex process. It can thus be seen that prior art MCDM techniques are unsuitable for handling complex problems in which many of the criteria take probabilistic (i.e. non-singular) values.

Although known MCDM techniques are unable to handle probabilistic criteria values, various techniques are known that allow reasoning to be carried out in uncertain circumstances. For example, Bayesian Belief Networks (BBNs) are known (see J. Pearl ibid). BBNs can be used to produce a model of criteria/objectives that have probabilistic values and it has been found that, in accordance with this invention, BBNs are particularly suited for modelling obsolescence arisings in complex articles.

Referring now to FIG. 4, operation of a simple BBN for selecting a replacement component for a complex object is described. In particular, FIG. 4a is a schematic of a Bayesian network describing two criteria; i.e. component cost 40 and probability of component failure 42. The cost criteria depends on two variables, namely the selected component supplier 44 and the exchange rate 46. The exchange rate is, in turn, related to the bank that is used to exchange the money 48 and the prevailing economic climate 50. The probability of component failure is related to three variables namely the amount of component use 54, the location of the component 56 and the selected supplier 44. The effect of component location 56 is, in turn, dependent on the temperature 58 and humidity 60 in which the component operates.

Once the network is set-up, each possible option for replacing the component can be modelled using the network. The various uncertainties associated with a first component choice (e.g. the exchange rate, selected supplier etc) would thus be fed into the network. The output of the network would be a probability distribution function (PDF) for each of the selected criteria for said first component choice. FIG. 4b illustrates the probability of failure of the first component choice as a function of time, whilst FIG. 4c shows the probable cost of that first component choice. Information associated with second and subsequent component choices can then be fed into the network and, in turn, cost and component failure probability curves are generated for each of the possible component replacement options.

Having generated the probabilistic criteria values for each component option, a multi-criteria optimisation process is performed to determine the best component choice options (e.g. to produce a Pareto optimal set of solutions). In order to use the prior art MCDM processes described above with reference to FIGS. 1 and 2, it would be necessary to take the average value and/or maximum/minimum values of the probability distribution for each of the criteria that was generated by the BBN. In other words, the PDF generated by the BBN would have to be converted into one or more singular criteria values to allow a decision tree to be formed. However, such a process would have the disadvantage that useful information that has been assimilated by the BBN is discarded. In contrast, the present invention provides a method that can use all the information available from the BBN.

One method for achieving optimisation of the criteria expressed as probabilistic values is the use of utility theory. Utility theory has its origin in the work of von Neumann and Morgenstern in 1943 (see J. von Neumann and O. Morgenstern. "Theory of Games and Economic Behavior", 1st edition, 1943, Princeton University Press) but it has been further developed and used since then. It is the most established approach to forming cost functions, probably because it has a rigorous axiomatic basis which nonetheless accommodates subjective human preferences through the mechanism of gambles. Utility theory works with two distinct types of quantity: utilities and probabilities. However utility theory often involves ad hoc weighted sums of utilities and certain challenges exist in deciding suitable weights.

Although utility theory methods could, in principle, be applied to the output of a BBN it has been found that the use of Measures of Effectiveness (MOE) theory is more suited to the task. MOEs are known and can be used to measure the extent to which system outputs satisfy related user requirements; for example, suitable outputs could include actual cost compared to budget. Their formulation is applicable to any data type, and so can deal with system characteristics expressed as probability density functions. MOEs can also take account of dependencies between criteria. In addition, multiple, even conflicting user requirements can be accounted for. MOEs are a measure of how the observed values for criteria match with the users' requirements and the MOEs theory is all-probabilistic. The main consequence of this is that standard probability relations are already prescribed for clarifying and solving problems such as combining MOEs for different factors or catering for multiple end users who do not agree on their requirements.

A number of MOEs schemes are known to those skilled in the art, but it is preferable to use an MOE scheme that meets at least some, and preferably all, of the following six criteria: (i) the MOE formulae should have a rigorous logical basis, (ii) MOE values should have a suitable physical meaning and lie on a well-defined scale, (iii) values should be easily calculated, (iv) it should be possible to handle consistently any type of data (e.g. continuous numeric, discrete numeric, enumeration and multi-dimensional), (v) there should be a mechanism for combining MOEs to obtain an overall MOE and (vi) the framework should be able to handle any expression of user requirements, whether objective or subjective in origin. A preferred MOE scheme that is theoretically the simplest possible, mathematically rigorous framework, and which satisfies all the above requirements is described in more detail below.

It may initially appear to a person skilled in the art that the concept of an MOE does not relate well to cost in monetary terms. Cost can be negative and can take very large values, for example. But, a MOE can express the acceptability of a given cost and arguably that is more important for decision making. For example, if an item cost of £100 were completely unacceptable, so would be a cost of £200. The latter cannot be twice as unacceptable, as we have already reached a limit.

The general formula for calculating a MOE is the overlap integral:

$$M = \int f_s(x) \rho_o(x) dx \quad (1)$$

where x is the quantity we want to assess, which most generally has a probability density function (PDF) $\rho_o(x)$. The dimensionless quantity $f_s(x)$ is called a user function because it is decided solely by the end user. The user function takes values in the range [0,1] and expresses the extent to which a specific value of x satisfies the user. '0' would be completely unacceptable and '1' would be completely acceptable. M is the dimensionless MOE value, which also lies in the range [0,1], and expresses the fraction of the x values that satisfy the user. A "0" indicates complete non-compliance and "1" indicates complete compliance.

Figure 5A:
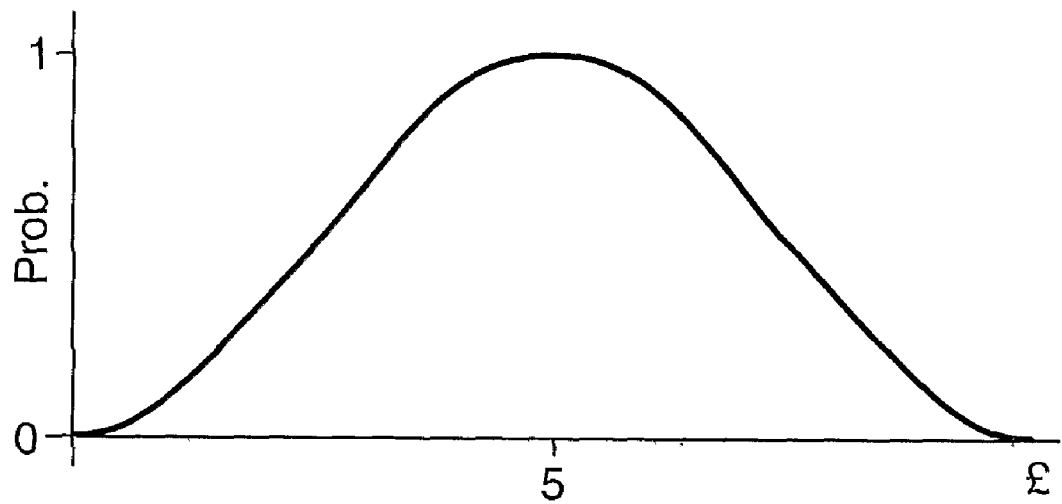
FIG. 5 shows a PDF and user function of a MOE.
Figure 5B:
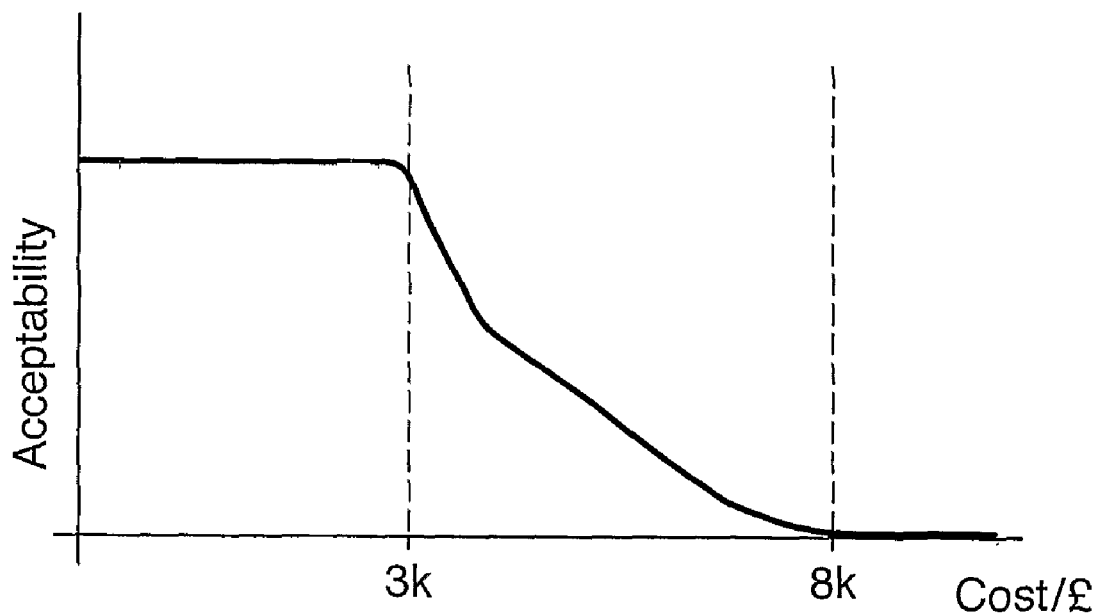

Referring now to FIG. 5, a typical PDF and a typical user function that could be used in MOE analysis of this type are illustrated. In particular, FIG. 5a shows a Gaussian cost PDF of the type that may be produced using a BBN as described with reference to FIG. 4. The PDF of FIG. 5a thus takes account of all the factors modelled by the BBN such as exchange rate, supplier etc. FIG. 5b shows the user function that has been decided by the end user. The user function of FIG. 5b illustrates that any cost below £3000 (£3K) is acceptable whilst a cost greater than £8000 (£8K) is not acceptable. Costs greater than £3k become more unacceptable as they increase towards the £8K cost ceiling. It should be noted that although FIG. 5 shows continuous PDFs and user functions, one or both of these functions may take the form of a histogram.

Turning now to a more quantitative example, the cost x of replacing a component may have a distribution modelled approximately by a Gaussian PDF:

$$\rho_o(x) = \frac{1}{\sqrt{2\pi}\,\sigma_o} \exp\left(-\frac{(x-\mu_o)^2}{2\sigma_o^2}\right) \quad (2)$$

where $\mu_o$ is the mean cost and $\sigma_o$ is the standard deviation. The user decides he wants a simple, single-parameter, algebraic user function and chooses the normalised Gaussian function:

$$f_s(x) = \exp\left(-\frac{x^2}{2\sigma_s^2}\right) \text{ for } x > 0 \quad (3)$$

where $\sigma_s$ is another standard deviation set by the user.

Inserting relations (2) and (3) into equation (1) and integrating over all positive x eventually produces the algebraic result:

$$M = \frac{\sigma_s}{2\sqrt{\sigma_s^2 + \sigma_o^2}} \exp\left(-\frac{\mu_o^2}{2(\sigma_s^2 + \sigma_o^2)}\right) \operatorname{erfc}\left(-\frac{\mu_o \sigma_s}{\sigma_0 \sqrt{2(\sigma_o^2 + \sigma_s^2)}}\right) \quad (4)$$

where 'erfc' is the Complementary Error Function defined by:

$$\operatorname{erfc}(w) = \frac{2}{\sqrt{\pi}} \int_w^\infty \exp(-w^2)dw \quad (5)$$

It should be stressed that equation (1) is a general formula. Where integration is necessary and cannot be done easily algebraically, it can be carried out numerically using, for example, a Monte-Carlo technique. In such an example, many random samples, say $\{x_i\}$ for i=1 to I, can be taken from the distribution $\rho_o(x)$ thereby giving an MOE that is closely approximated by:

$$M = \frac{1}{I}\sum_{i=1}^{I} f_s(x_i) \quad (6)$$

Equation (6) is simply the average of the user functions evaluated at the sample values. Almost any distribution can be appropriately sampled using Monte-Carlo Markov Chain (MCMC) techniques in this manner. However, there are several special cases, including those most likely to be encountered, where the result given in equation (1) reduces to a simple formula that can be solved without having to resort to numerical integration techniques.

A first example of such a special case is when measurements occur as a set of pairs $\{x_i, P_{oi}\}$ for i=1 to I say, where the $P_{oi}$ are probabilities which sum to unity. An example is the histogram for the lifetime of a component, where $x_i$ encompasses all lifetimes falling within year i and $P_{oi}$ is the corresponding fraction of lifetimes. In such an example, the MOE is given by:

$$M = \sum_{i=1}^{I} f_{si} P_{oi} \quad (7)$$

where $f_{si}$ is the user acceptability of value $x_i$ with values in the range [0,1].

Table 1 contains data that describes the lifetime of the component. In this case, no component lasts longer than 10 years.

TABLE 1

Histogram of the lifetime of a component

| | $x_i$ | | | | | | | | | |
|---|---|---|---|---|---|---|---|---|---|---|
| | 1 | 2 | 3 | 4 | 5 | 6 | 7 | 8 | 9 | 10 |
| $P_{si}$ | 0.14 | 0.19 | 0.10 | 0.06 | 0.04 | 0.02 | 0.05 | 0.08 | 0.12 | 0.20 |

Suppose also that the user completely accepts any lifetime greater than 6 years and completely rejects any lifetime less than 4 years. The years in between are awarded intermediate acceptability values providing the user function histogram of table 2.

TABLE 2

Component lifetime user function

| | $x_i$ | | | | | | | | | |
|---|---|---|---|---|---|---|---|---|---|---|
| | 1 | 2 | 3 | 4 | 5 | 6 | 7 | 8 | 9 | 10 |
| $f_{si}$ | 0.0 | 0.0 | 0.0 | 0.2 | 0.5 | 0.8 | 1.0 | 1.0 | 1.0 | 1.0 |

By formula (7), the MOE is found to be M=(0.0*0.14)+ (0.0*0.19)+(0.0*0.10)+(0.2*0.06)+(0.5*0.04)+(0.8*0.02)+ (1.0*0.05)+(1.0*0.08)+(1.0*0.12)+(1.0*0.20)=0.50 (rounded). An MOE value of 0.5 might be judged as "fair"; i.e. it is not a perfect "1" nor a totally unacceptable "0".

Turning now to a second special case, it is noted that, in practice, most measurements come as samples in the form $\{x_i\}$ for i=1 to I. In contrast to the first special case described above, there are not explicit probabilities associated with the samples. Effectively, they are all the same. The MOE formula for this situation becomes:

$$M = \frac{1}{I}\sum_{i=1}^{I} f_s(x_i) \quad (8)$$

This is the same as formula (6), but does not require that the samples be random ones. Often, just a single measurement x may be evaluated, in which case result (8) reduces to:

$$M = f_s(x) \quad (9)$$

Turning to a third special case, it is noted that there are some circumstances in which the measurements uniformly cover some region of measurement space with volume $V_o$ say, and where the user will only accept those measurements within another region with volume $V_s$. In such a case, the MOE is given by:

Taking the K'th root makes the overall MOE look like a simple MOE. Otherwise, even if all the individual MOEs had a good value, the overall value would look bad. More generally, we are likely to have dependent measurements, but, by reason of what can be managed practically, it is unlikely that user functions will be given other than as independent quantities. Suppose there are K variables and that we can obtain a large number I of random samples $\{x_{1i}, x_{2i}, \ldots x_{Ki}\}$ for i=1 to I. Then, the equivalent of result (12) is:

$$M' = \left(\frac{1}{I}\sum_{i=1}^{I} f_{s1}(x_{1i}) f_{s2}(x_{2i}) \ldots f_{sK}(x_{Ki})\right)^{\frac{1}{K}} \quad (13)$$

Equation (13) is the simplest expression that can be used to describe the overall MOE when there are dependent measurements. In other words, equation (13) can not be reduced to a simple algebraic form analogous to equation (12) which was derived for the case of independent measurements.

Equation (12) deserves some further comment. Effectively, it requires that the user is satisfied jointly on all points. If just one of the individual MOEs is poor, the overall MOE will be poor. However, in a generalisation of MOE theory, to do with how multiple users (or a single user with multiple requirements) are satisfied, the following result can also be obtained:

$$M' = \sum_{k=1}^{K} W_k M_k \quad (14)$$

where the $W_k$ are weights to do with relative importance and which must sum to unity. However, it is evident that one can obtain a good overall MOE by satisfying the user on just some of the points well.

Equation (14) is thus somewhat similar to a widely used formula for combining utilities. The special case of MOE theory expressed in equation (14) mirrors the weighted sum of $$M = \frac{V_o \cap V_s}{V_o} \quad (10)$$

Equation (10) expresses the overlap of the two volumes, appropriately normalised. In other words, it expresses the fraction of measurements that are acceptable.

As a practical example of the third special case, consider the gain of an alternative power transistor that can be anywhere between 24.8 dB and 31.8 dB. To satisfy gain tolerances for a feedback amplifier, the customer requires that the power transistor has a gain of at least 30.0 dB.

To calculate the MOE for the alternative power transistor, let d([a, b]) denote the interval between quantities a and b. Then, working with dB units, the MOE of the alternative transistor is found to be:

$$M = \frac{d([24.8, 31.8] \cap [30.0, \infty])}{d([24.8, 31.8])} = \frac{d([30.0, 31.8])}{d([24.8, 31.8])} = \frac{1.8}{7.0} = 0.26 \quad (11)$$

This is a low value and the transistor might be judged 'poor'.

The three special cases described above are relevant to certain practical situations. However, it is often the case that when performing MCDM for a complex article it is necessary to combine MOEs for different aspects of performance to produce an overall MOE value. It turns out that, provided the respective measurements are independent of one another, the overall MOE is given by the geometric mean:

$$M' = \left(\prod_{k=1}^{K} M_k\right)^{\frac{1}{K}} \quad (12)$$

utilities formula. At first sight this might seem to diminish the uniqueness and value of MOE theory, but the weighted sum of MOEs/utilities only requires some of the criteria or users to be satisfied very well to get by. Hence, although formula (14) could be employed to express an overall MOE, it has been found not to be the best basis for performance assessment or for devising cost functions because it is too lenient. Also, it presents the challenge of having to ascertain suitable weights which is completely avoided with result (12) or (13). The skilled person would also recognise that there are further formulae between the extremes of results (12) and (14) representing intermediate cases that may be appropriate for certain circumstances.

It should be noted that all MOEs mean exactly the same thing, irrespective of the variables/criteria to which they relate. A MOE is the extent to which one or more aspects of performance satisfy a user. Even monetary cost/reward can be expressed in customer satisfaction terms and in this respect it is no different to other criteria because it is treated in exactly the same way. Using a combined MOE entails an invariably simple, single-variable decision process and also reveals immediately how well one is doing on an easy to understand absolute scale. If necessary, MOEs for separate criteria (e.g. monetary cost) can still be scrutinised.

As noted above, alternative theories, such as utility theory, could be used instead of an MOE based approach. Both utility theory and MOE theory handle all types of data (i.e. continuous numeric, discrete numeric, enumeration and multi-dimensional). However, utility theory is based on two different types of quantity, namely utility functions and probabilities, whereas MOE theory is all-probabilistic. In other words, it can be shown that the user function of MOE theory is properly given by a normalised PDF as follows:

$$f_s(x) = \frac{\rho_s(x)}{\max_x (\rho_s(x))} \quad (15)$$

where $\rho_s(x)$ is a PDF for user acceptance and $\max_x(\rho_s(x))$ is its largest value over the range of x of interest. The practical consequence of this is that probability theory is inherently suited to solving problems involving various combinations of users, differing requirements and individual MOEs. In contrast, it is often not clear how to combine utilities resulting in the use of ad hoc combination formulae involving weighted sums of individual utilities. The skilled person would thus recognise that the use of MOE theory is thus the preferred, although by no means the only, way of implementing MCDM in accordance with this invention.

Referring now to FIGS. 6 to 9, various examples will be given that are concerned with the optimisation of possible solutions to a portfolio of microelectronics Obsolescence Arisings (OAs).

Microelectronics are typically critical components in many systems such as aircraft and the like. Some of these microelectronic components may become obsolete before the equipment life cycle ends. The replacement of obsolete components may be required for a number of reasons and it is not unknown for components to become obsolete even before the production of an article commences. Last Time Buy (LTB) notifications are typically issued by the electronics industry to inform customers that a particular component is to become obsolete and to provide them with the opportunity to buy enough components to last the lifetime of the system in which the component is being used.

In addition to the purchase of components on receipt of an LTB notification, there will be other options for resolving the OA which need to be evaluated. For example, a redesign of circuit boards or subsystems containing the obsolete component could be considered. For each component of an article there will be a certain amount of information in its "entry" in the equipment portfolio. This information may consist of: (i) The structure of the article, system, or subsystem hierarchy in which it is a component and (ii) the number and type of options that are available to deal with the OA. Each identified option will have associated costs (criteria that are to be minimised) and benefits (criteria that are to be maximised).

It is also possible that the obsolete components may be used on a number of different circuit boards throughout the article and each board may use a number of the obsolete components (almost certainly a different mix of such components on each board). In addition, there may be other components within the article that are predicted to become obsolete in the near future and planned technology insertions which also need to be considered. Furthermore, there may be many other OAs throughout the article that also need to be addressed.

Each option for resolving an issue related to an obsolete component will thus have a number of criteria (such as acquisition costs, reliability, system availability, time to implement) associated with it that may be used to evaluate the cost-effectiveness of that option. This gives rise to a complex multi-criteria optimization problem in which the aim is to identify a cost-effective suite of solutions that considers the problem at a system level, rather than an individual component level, to resolve a portfolio of OAs and potential future OAs. Sophisticated optimization techniques that can be used to maximize the beneficial criteria and minimize the costs across all of the options selected are thus required. It should also be noted that the various criteria are not likely to be wholly complimentary and so a trade-off of the costs against the benefits may be required.

As noted above, it has been found that the uncertainty and dependencies associated with the criteria that are used to assess the various options for dealing with an obsolete component can be modelled using a BBN. In order to assess the 'value' of a particular option, the available evidence is propagated through the network to produce a probability distribution embodying the likelihood of particular values for each of the criteria. The probability distributions generated by the BBN are then analysed using MOEs in combination with an optimisation technique such as a genetic algorithm.

As outlined above, MOEs are a measure of how the observed values for criteria match with the users' requirements. This is achieved through the use of a user function which returns values between zero and one to quantify acceptability; zero defines an unacceptable option whilst one defines a completely acceptable option. For example a stakeholder may consider a cost of zero dollars to be the most acceptable and a cost of one million dollars and above to be unacceptable to pay for the design of a new component. These two design costs would be allocated the maximum and minimum values respectively by the user function and the user function values assigned to the design costs in-between the minimum and maximum would decrease monotonically at a rate specified by the stakeholder. It should be noted that an obsolescence arising may have more than one location within the system and hence different locations of the OA may have different user functions for each of the criteria to reflect differing priorities.

The MOE framework employs the user function information and the BBN provides probability distribution functions for each criteria. MOE values can thus be produced for each criterion of each option that reflects the degree to which the stakeholders' requirements have been met. The MOE values for each criterion can be combined to produce a single MOE for the particular option to facilitate their display. Potential sets of solutions can thus be plotted against their acquisition costs in order to allow one of an appropriate set of solutions to be selected by a decision maker.

The outcome of the optimisation process is ideally the Pareto optimal set that comprises a set of solutions each of which are not dominated by the others in terms of all criteria. It is the Pareto set of optimal solutions that are ideally presented to a decision maker to make a final choice that provides a desired trade-off.

For a more detailed explanation of how OAs problems can be approached, consider a platform that consists of three systems, namely (i) a radar, (ii) a flight computer and (iii) a digital engine control unit (DECU). Each of the three systems has two integrated circuit boards. The problem scenario consists of a last time buy notice for obsolete component IC5 (part type E) on one of the boards in the radar and the full scenario is described in table 3.

TABLE 3

A description of the problem scenario

| LEVEL | DESCRIPTION | NO. USED ON BOARD | YEARS TO OBS. | LTB DATE | PART TYPE | YRS TO BOARD UPGRADE |
|---|---|---|---|---|---|---|
| 1 | | | PLANE | | | |
| 2 | | | RADAR | | | |
| 3 | Board 1 | | | | | 3 |

TABLE 3-continued

A description of the problem scenario

| LEVEL | DESCRIPTION | NO. USED ON BOARD | YEARS TO OBS. | LTB | LTB DATE | PART TYPE | YRS TO BOARD UPGRADE |
|---|---|---|---|---|---|---|---|
| 4 | IC1 | 3 | 0 | | | A | |
| 4 | IC2 | 10 | 2 | | | B | |
| 4 | IC3 | 2 | 4 | | | C | |
| 4 | IC4 | 1 | 6 | | | D | |
| 4 | IC5 | 1 | | LTB | 30 Jun. 2005 | E | |
| 3 | Board 2 | | | | | | 5 |
| 4 | IC8 | 5 | 0 | | | A | |
| 4 | IC11 | 1 | 2 | | | B | |
| 4 | IC10 | 1 | 4 | | | C | |
| 4 | IC6 | 3 | 6 | | | X | |
| 4 | IC7 | 2 | 2 | | | Y | |
| 4 | IC9 | 1 | 6 | | | Z | |
| 2 | | | FLIGHT COMPUTER | | | | |
| 3 | Board 3 | | | | | | 4 |
| 4 | 1C12 | 6 | 0 | | | A | |
| 4 | 1C13 | 1 | 2 | | | B | |
| 4 | 1C14 | 1 | 4 | | | C | |
| 3 | Board 4 | | | | | | 4 |
| 4 | IC15 | 2 | 6 | | | X | |
| 4 | IC16 | 2 | 2 | | | Y | |
| 4 | IC17 | 1 | 6 | | | Z | |
| 2 | DECU | | | | | | |
| 3 | Board 5 | | | | | | 6 |
| 4 | IC18 | 1 | 0 | | | 1 | |
| 4 | IC19 | 2 | 2 | | | 2 | |
| 4 | IC20 | 6 | 0 | | | A | |
| 3 | Board 6 | | | | | | 2 |
| 4 | IC21 | 2 | 0 | | | 1 | |
| 4 | IC22 | 2 | 2 | | | 2 | |
| 4 | IC23 | 6 | 6 | | | 3 | |

Analysis of all three systems in the platform reveals further obsolete components that affect five out of the six boards; namely, part type A on boards in all 3 systems and part type 1 on two boards in the DECU.

For each component in the platform, information on the number of components (and their types) used on each board, and the number of years to obsolescence is available. For each board the number of years until a strategic upgrade will be performed is known.

Further analysis of the platform reveals that a further four part types will become obsolete before the boards on which they are placed are due to be upgraded. The four part types are (1) part type B on 2 boards in the radar and 1 board in the flight computer, (2) part type C on 2 boards in the radar and 1 board in the flight computer, (3) part type Y on 1 board in the radar and 1 board in the flight computer and (4) part type 2 on two boards in the DECU.

The above provides an example portfolio of seven OAs and potential OAs to be resolved. In order to obtain a suite of solutions that have been optimised across the platform, an Evolutionary Algorithm is used. As described above, evolutionary algorithms are a group of techniques, which include genetic algorithms, that can be applied to a variety of optimisation problems. EAs are inspired by genetics and Darwinian natural selection.

In general, EAs work by maintaining a "population" of prospective solutions which are called "individuals". The population is iteratively improved by applying "genetic operators" to the individuals. The improvement is measured using a "fitness function"; a mathematical formula that provides an indication as to how well a particular individual performs the desired task. The iteration continues until some stopping criterion is met.

Figure 6:
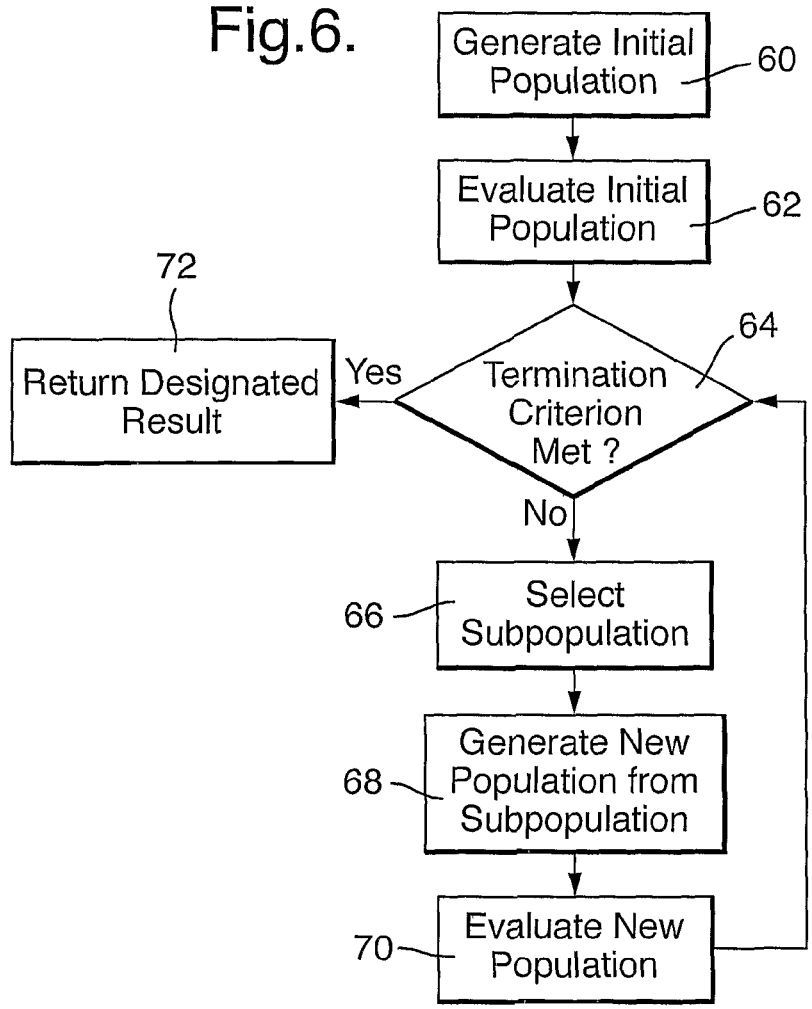
FIG. 6 shows the steps involved in a genetic evolutionary algorithm.

Referring to FIG. 6, the operation of a general evolutionary algorithm is illustrated. An evolutionary algorithm can be tailored to a particular problem domain through the adaptation of its fitness function, genetic operators and the form, or representation, of the individuals that are evolved. Therefore, the design of the fitness function, the genetic operators and the representation of the individuals are the most crucial constituents of an evolutionary algorithm. Their structure and implementation need to be studied and refined for each new problem domain.

In this case, potential solutions are encoded as a fixed length bit string called a "chromosome". The genetic algorithm is initialised by randomly generating an initial population as shown in step 60 of FIG. 6. The initial population is then evaluated using the fitness or objective function of step 62. This evaluation provides an indication of how well an individual solves the target problem.

If the termination criterion of step 64 is not met, the "survival-of-the-fittest" principle is used. This principle allows better or fitter solutions to be combined to produce new individuals to be placed in the next generation. In general terms, the "survival-of-the-fittest" principle involves a selection step 66 to select a sub-population from which a new population is generated by step 68. An evaluation step 70 is performed on the new population, and the whole process repeated until the termination criterion of step 64 is satisfied and a result returned 72.

The three main genetic operators used in genetic programming (i.e. in the creation of a new population from the existing population) are (a) reproduction, (b) mutation and (c) crossover. These genetic operators are applied with pre-prescribed probabilities.

The reproduction operator requires a single parent individual to be selected from the current population and makes a direct copy of it to form the offspring. The new offspring is then placed in the new population of individuals.

The mutation operator also requires a single parent individual to be selected from the current population. In this case the individual is copied and a bit position is randomly selected to be flipped. The new mutated individual is then placed in the new population. The purpose of the mutation operator is to maintain diversity in order to prevent the convergence of the population to a sub-optimal region of the solution space. For example, the fourth bit of the parent's binary string "00101011101" may be flipped to provide the mutated string "00111011101".

The Crossover operator requires two parents to be selected from the current population (e.g. "00101011101" and "01010101011"). Both parents are copied and then a crossover point is randomly selected in the first parent (e.g. between the fifth and sixth bits). Two new individuals are created from the copies made from their parents. The first offspring ("00101101011") consists of the pre-crossover point section of one parent and the post-crossover point section of the second parent. The second offspring ("01010011101") is created from the remaining sections of the parents.

The parents used by the above genetic operators are selected based on their fitness values so that fitter individuals have a higher chance of being selected. There are a number of methods that implement this idea, the two most popular being "tournament" and "roulette wheel" selection.

In the case of tournament selection a small group of individuals are randomly selected from the current population and their fitness values compared. The individual with the highest fitness value wins the tournament and is manipulated by the genetic operators before being placed in the new population. In proportional or roulette wheel selection, each individual in the population is assigned a probability of selection that is proportional to their relative fitness. This technique for incorporating selective pressure can be viewed as analogous to a roulette wheel in which each slice corresponds to an individual in the current population, with the size of the slice proportional to the fitness of the corresponding individual. When the roulette wheel is 'spun', the individuals of higher fitness, having a higher proportion of the wheel, will have a higher probability of being selected.

Turning again to the above described seven component, six board obsolescence problem defined in table 3 it is noted that obsolete part type A can be found on boards 1,2,3, and 5; part type B can be found on boards 1, 2, and 3; part type C can be found on boards 1, 2, and 3; part type E can be found on board 1; part type Y can be found on boards 2 and 4; part type 1 can be found on boards 5 and 6 and part type 2 can be found on boards 5 and 6. This problem can be solved using a GA.

Figure 7:
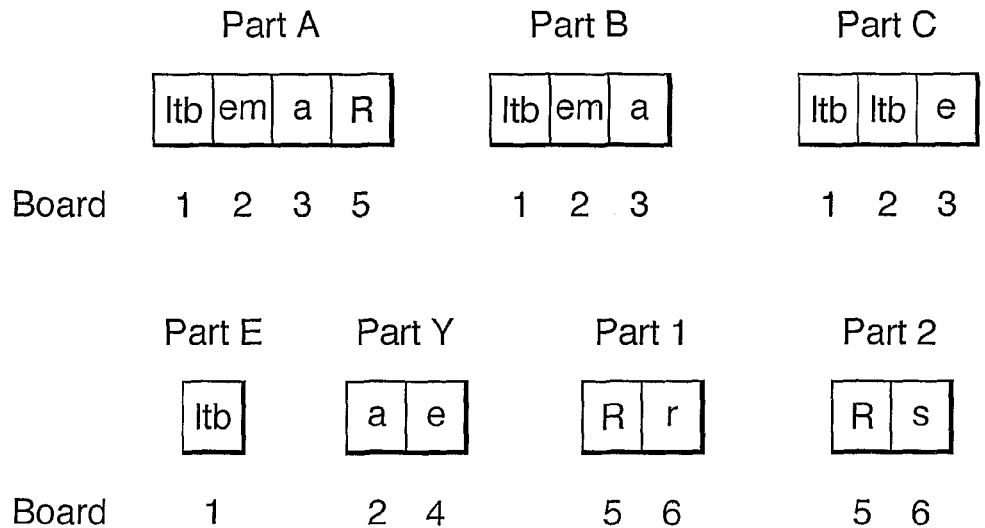
FIG. 7 shows a potential solution generated by a genetic algorithm for resolving a seven component, six board, obsolescence problem.

As outlined above, the initial step when using a GA is to create an initial population of potential solutions. One such potential solution is shown in FIG. 7. In particular, FIG. 7 shows the relevant part and board and "ltb" indicates a last time buy option has been chosen, "em" indicates that the emulation option has been chosen, "a" indicates that the alternate option has been chosen, "s" indicates that the substitute option has been chosen, "e" indicates that the existing stock option has been chosen, "r" indicates that the reclamation option has been chosen, and "R" indicates that a board redesign option has been chosen.

The aim of the optimisation process is to find a cost effective solution for each component on each board bearing in mind that an option that preferably resolves each of the obsolete components needs to be found. Each potential solution thus consists of a portfolio of options, one for each component. It should be noted that the options are available at both the component and board level and if a board level option is chosen for a part type, then that option must also be specified for every other component that is placed on that board. For example, in the solution represented in FIG. 7, a board redesign has been specified for parts A, 1 and 2 for board 5. An optimum solution caters for all obsolete components.

Once a population of individuals has been created they need to be evaluated to identify how well they solve the problem. Each option has a number of criteria associated with it for example: acquisition costs, reliability, system availability, time to implement. Criteria such as reliability and system availability are to be maximised; these criteria are referred to as beneficial criteria. Criteria such as acquisition costs and time to implement are to be minimised; these criteria are termed cost criteria. As the values for each criterion are probability distributions rather than point values, MOEs are used to obtain a measure of the fitness of each solution.

In order to use the MOE framework to evaluate the fitness of a potential solution, each criterion needs a user function to identify the acceptability of its values to the user. For example, the user function for the acceptability of beneficial criteria could be specified by:

$$f_s(x) = \frac{1}{2}(1 + \tanh(a(x - b))) \qquad (16)$$

where parameter 'b' is the value of x for $f_s(x)=\frac{1}{2}$ and the parameter 'a' sets the curve shape through the following equation:

$$\Delta = \frac{1.099}{a} \qquad (17)$$

where $\Delta$ is the separation in x between $f_s=\frac{1}{2}$ and $f_s=0.1$ points.

The user function defined by equations (16) and (17) is displayed graphically in FIG. 8. By changing the value of $\Delta$, the mid-slope of the curve is altered thereby determining the rate at which the users' acceptability of the criteria under consideration changes. Smaller values of $\Delta$, produce steeper slopes, whilst larger values produce shallower slopes. In FIG. 8 the mid-point "b" has been specified as 2000 and parameter "a" is obtained through the relationship expressed in equation (17).

The user function for the cost criteria can be specified as the complement of the benefit user function equation:

$$f_s(x) = 1 - \frac{1}{2}(1 + \tanh(a(x - b))) \qquad (18)$$

The slope of the curve resulting from equation (18) is again specified by the parameter $\Delta$ defined in equation (17). The cost criteria user function of equation (18) is plotted in FIG. 9 and the effect of different values for $\Delta$ on the curve can be seen. In this case, the mid-point "b" has been selected as the value 10,000 and again parameter "a" is obtained through the relationship expressed in equation (17).

Taking the benefit and cost user functions defined in equations (16) and (18) it is possible to generate the MOE for the benefit and cost criteria for each option that is available for dealing with the obsolescence of a part. As explained above, the MOE of an option is derived from the user function combined with the calculated probability function that can be determined using a BBN analysis of the problem. In this manner, an MOE can be derived for each option associated with each OA on each board.

As an example, the probability function (PF) associated with the acquisition cost criteria for the last time buy (LTB) option for dealing with the OA of part type A on board 1 is given in the first two columns of table 4. It should be noted that the probability function is in the form a histogram.

TABLE 4

An example probability function and MOE value associated with the acquisition cost criteria for a last time buy option for pan type A on board 1.

| Cost band ($x_i \to x_{i+1}$) | PF $P_i$ | Y |
|---|---|---|
| 0->£5k | 0.01 | 0.0000010961 |
| £5k->£10k | 0.45 | 0.000038879 |
| £10k->£15k | 0.20 | 0.000012027 |
| £15k->£20k | 0.15 | 0.0000055391 |
| £20k->£25k | 0.10 | 0.0000020509 |
| £25k->£30k | 0.05 | 0.00000053297 |
| £30k->£35k | 0.02 | 0.00000010665 |
| £35k->£40k | 0.01 | 0.000000026145 |
| £40k->£45k | 0.005 | 0.0000000063442 |
| £45k+ | 0.005 | 0 |
| | | M = 0.4113 |

As described above, the calculation of the MOE associated with a criterion for an option is given, in general, by equation (1). However, in this case the probability function of the criterion values are in the form of a histogram (i.e. it is defined in the first two columns of table 4). Taking the user functions described above in equations (16) and (18) for beneficial and cost criteria respectively, then the MOE calculation of equation (1) becomes:

$$M = \frac{1}{2}\sum_{i=1}^{N} \frac{P_i}{\Delta x_i} \int_{x_i}^{x_{i+1}} (1 \pm \tanh(a(x-b))) dx \quad (19)$$

where the "+" operator is present for benefit criteria and the "−" operator is used for cost criteria, N is the number of cost bands, $\Delta x_i$ is the size of cost band i and the $P_i$ are probabilities such that $$\sum_{i=1}^{N} P_i = 1$$

(for completeness).

For cost criteria equation (19) thus becomes:

$$M = \frac{1}{2a}\sum_{i=1}^{N} \frac{P_i}{\Delta x_i} \ln\left[\frac{1+\exp(-2a(x_i-b))}{1+\exp(-2a(x_{i+1}-b))}\right] \quad (20)$$

where $\Delta x_i = x_{i+1} - x$. At this point, it should be noted that the value Y given in table 4 is defined as;

$$Y = \frac{P_i}{\Delta x_i}\ln\left[\frac{1+\exp(-2a(x_i-b))}{1+\exp(-2a(x_{i+1}-b))}\right]. \quad (21)$$

For beneficial criteria equation (19) becomes:

$$M = \frac{1}{2a}\sum_{i=1}^{N} \frac{P_i}{\Delta x_i}\ln\left[\frac{1+\exp(2a(x_{i+1}-b))}{1+\exp(2a(x_i-b))}\right] \quad (22)$$

By choosing suitable values for the parameters of the user function (i.e. values for a and b) equations (20) and (22) can be used to calculate the MOE value associated with cost and beneficial criteria respectively.

Equation (20) has been used with user function parameter values a=(1.099/15000) (i.e. Δ=15000) and b=10000 to calculate the overall MOE value (M) for the example cost criteria probability function of table 4. Column 3 of table 4 thus contains the value Y of equation (21) for each cost band, and the cost criteria MOE (M), for the option of using the LTB call to replace part type A on board 1.

If there is more than one user function associated with a criterion (e.g. if there are two users with different requirements), the MOE associated with each user function is combined using equation (12). Once all the MOEs associated with all the criteria (e.g. cost and benefit) for an option have been calculated, they are combined into a single MOE for the option, again using equation (12). The fitness associated with a suite of options for addressing a portfolio of OAs is then the arithmetic mean (or sum if suites are compared that include the same number of options) of the MOEs of the options in the suite. The newly generated potential solutions (i.e. the current Pareto optimal set) are saved.

Once the fitness of all the individuals in the initial population has been calculated, a check is made to determine whether or not the termination criterion has been met; i.e. a pre-arranged number of iterative search steps has been carried out. If the termination criterion has not been met, the computer begins a procedure to generate improved solutions by using genetic operators to create a new population of potential solutions from the previous population. A population count index is reset to zero, and a check is made to determine whether or not the new population is complete. If the new population is not complete, a potential solution is selected from the previous population.

In order to create a new population of potential solutions, the top 10 percent (in terms of fitness value) of the previous population are copied directly into the new population. Another 20 percent of the new population are generated as new individuals. The remaining 70 percent of the new population are created using the crossover operator. In order to carryout crossover, two potential solutions are selected from the previous population using roulette wheel selection and portions of their genetic material are swapped over (as described above). New individuals created by the crossover operator then have a 10 percent chance of being further manipulated by a mutation operator where an option for resolving an OA in the portfolio is altered to another option. The new population is then evaluated as before and any individuals in the saved current Pareto optimal set that are dominated by individuals in the new population are replaced by those individuals to create a new Pareto optimal set.

This process of producing new potential solutions from old ones iterates until the population count indicates that the new population of potential solutions is of prearranged number, e.g. equal to the population size created at initialisation. When the prearranged number is reached, the iteration count G is incremented by 1 and then the potential solutions in the new population are evaluated. The termination criterion is then checked again. The procedure continues if the termination criterion is not met, i.e. if the iteration count G has not reached a prearranged maximum. If the termination criterion is met, the computer terminates the search and returns the current Pareto optimal set.

Although the use of a EA has many advantages, it should be noted that other optimisation techniques can be used in conjunction with MOEs to find solutions to an MCDM problem with probabilistic criteria values. For example, dynamic programming (DP) could be used. Enumeration techniques could also be employed.

Dynamic programming solves problems by breaking them up into sub-problems that then form the overall solution. This can be recursive such that these sub-problems can be broken down and so forth. Dynamic programming can solve a problem if it meets the following criteria: (i) The problem can be decomposed into a series of sub-problems, which can be used to answer the final problem, (ii) each sub-problem has a number of possible states, (iii) a decision takes you from one state at one stage to some state at the next stage, (iv) the best sequence of decisions at any stage is independent of the decisions made at prior stages and (v) there is a well-defined cost for traversing from state to state across stages (e.g. there is a recursive relationship for choosing the best decisions to make).

A DP algorithm builds up a solution from simple examples which get progressively more complex. Applying this to the portfolio of microelectronics OAs problem described above, the problem can be broken down into sub problems. For example, if the nth part is the selection of an option with cost w, then the best solution of n−1 parts and maximum cost minus w is the full solution. Thus working from 1 to n parts and from 1 to max cost, the solution at each stage can be constructed from the previous solutions to simpler parts of the problem. Thus the run time for this solution is of the order m×n (number of cost bands multiplied by n parts to be resolved, multiplied by the number in of options for each item). For larger values of m and n (i.e. >5) this is a significant improvement on $m^n$ for iterating through every possible solution. Furthermore, the algorithm will have stored and calculated the best options for all cost bands; a decision-maker can thus see numerous best options for varying costs.

The algorithm can thus be considered to have four steps as follows:

(i) For 1 to numparts (e.g. piles of objects)
(ii) For 1 to maxcost
(iii) For 1 to maxoptions for current item
(iv) If (value for option+bestsolution for partnum−1) and (maxcost−cost for option) is a better solution than current best then make it current best
Else make the best solution at this stage the same as at same cost but itemnum−1

An example will now be given of the application of the dynamic programming method to an example microelectronics OA portfolio. The initial problem is outlined in table 5 and consists of a portfolio of three OAs (i.e. parts 1, 2 and 3) which need to be resolved. There are two options that can be used to resolve the OA and for the general problem under consideration, a maximum budget to be spent on resolving the portfolio of OAs is assumed.

The DP algorithm works by progressively increasing the costs that may be incurred, in user definable increments, until the maximum stated budget is reached. With each cost increment, the algorithm considers which of the methods to resolve the OAs can be afforded given their associated costs. The cost associated with each method at this point is the mean cost for that method. The MOE value takes into account all the criteria, including cost, and all user preferences. Keeping the cost separate for DP is merely to allow the process to identify the MOE value of solutions for specific budgets.

TABLE 5

An example OA portfolio optimisation problem

| | Option 1 | | Option 2 | |
|---|---|---|---|---|
| | Cost | MOE Value | Cost | MOE Value |
| Part 1 | £4k | 0.6 | £7k | 0.3 |
| Part 2 | £5k | 0.5 | £8k | 0.3 |
| Part 3 | £3k | 0.9 | £1k | 0.4 |

The algorithm will thus go through to the maximum cost (either the maximum budget available or the combined largest costs for resolving each OA, whichever is the smaller), with only the first part. From table 5, it can be seen that the most expensive options for resolving each of the three OAs cost £7k, £8k and £3k and therefore the maximum cost can be taken to be £18k.

The cost matrix for replacing obsolete part 1 is provided in table 6. From table 5 it can be seen that at a maximum cost of £4k, option 1 can be selected. The MOE value associated with option 1 is thus placed in table 6. Option 1 proves to be the best option until max cost is reached. Even when the maximum cost rises to £7k, and option 2 may be selected (i.e. with a max cost of £7k option 2 can be afforded), the MOE value associated with purchasing option 2 remains less than the MOE value of purchasing option 1 for the first OA.

TABLE 6

Value Matrix for Part 1

| | | | | | | | Max Cost (£k) | | | | | | | | | | | | |
|---|---|---|---|---|---|---|---|---|---|---|---|---|---|---|---|---|---|---|---|
| Part | 1 | 2 | 3 | 4 | 5 | 6 | 7 | 8 | 9 | 10 | 11 | 12 | 13 | 14 | 15 | 16 | 17 | 18 |
| 1 | 0 | 0 | 0 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |

After generating the value matrix for part 1 only (i.e. as shown table 6) the algorithm will go through both parts 1 and 2 looking for the best solution (i.e. best MOE) for each maximum cost step; this is shown in table 7. It can be seen that, up to a max cost of £8k, table 7 is the same as table 6 above (i.e. at a max cost below £8K it is not possible to implement either option 1 or 2 for part 2 if option 1 for part 1 has been implemented). However, at a maximum cost of £9k, the cost of the first option for part 2 (i.e. £5k) can be taken with the best option (option 1) for the first part. The MOE value at a maximum cost of £9k thus reflects the fact that two OAs can be resolved and take the value of 0.6+0.5=1.1. This value cannot be improved upon with increased maximum cost and so remains the same for the rest of the maximum costs options.

TABLE 7

Value Matrix for parts 1 and 2

Max Cost (£k)

| Pts | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 0 | 0 | 0 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 2 | 0 | 0 | 0 | 0.6 | 0.6 | 0.6 | 0.6 | 0.6 | 1.1 | 1.1 | 1.1 | 1.1 | 1.1 | 1.1 | 1.1 | 1.1 | 1.1 | 1.1 |

Now resolving parts 1, 2 and 3 it can be seen from table 5 that it is possible to select (a) option 2 for part 3 at a maximum cost of £1K or (b) option 1 for part 3 at a maximum cost of £3K. Options 2 and 1 for resolving the OA of part 3 give MOEs of 0.4 and 0.9 respectively as shown in table 8.

TABLE 8

Value matrix for parts 1, 2 and 3.

Max Cost (£k)

| Pts | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 0 | 0 | 0 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 2 | 0 | 0 | 0 | 0.6 | 0.6 | 0.6 | 0.6 | 0.6 | 1.1 | 1.1 | 1.1 | 1.1 | 1.1 | 1.1 | 1.1 | 1.1 | 1.1 | 1.1 |
| 3 | 0.4 | 0.4 | 0.9 | 0.9 | 0.9 | 0.9 | 1.5 | 1.5 | 1.5 | 1.5 | 1.5 | 2.0 | 2.0 | 2.0 | 2.0 | 2.0 | 2.0 | 2.0 |

At a maximum cost of £3k, the best option that can be afforded is the option 1 for resolving the OA for part 3 giving an MOE value of 0.9. This is better than the best option for part 1 (which has a cost of £4k but a MOE value of 0.6). This selection remains preferable until a maximum cost of £7k is reached. At a maximum cost of £7K, the best option for part 1 can be combined with option 1 for part 3 as the maximum MOE value that can be afforded at cost (£7k−£3k=)£4k for the first two parts is 0.6 and thus the value of (0.9+0.6=) 1.5 can entered in that column. No changes occur until a maximum cost of £12k is reached, where the best value at cost (£12k−£3k=) £9k for the first two piles is 1.1, so the combined total value is now (0.9+1.1=) 2.0 which proves to the best solution for all maximum costs and all options for all parts.

After performing the calculations to produce the results of table 8, the Pareto optimal set of table 9 can be created. In this example, the set of non-dominated solutions can thus be seen to consist of four solutions; one for budget £1k to £2k, another for budgets up to £6k, a third for a budget of up to £11k, and a final solution for budgets up to £18k.

TABLE 9

The Pareto optimal set of solutions

| Part 1 | Part 2 | Part 3 | MOE Value | Cost |
|---|---|---|---|---|
| No solution | No solution | Option 2 | 0.1 | £1k |
| No solution | No solution | Option 1 | 0.3 | £3k |
| Option 1 | No solution | Option 1 | 0.5 | £7k |
| Option 1 | Option 1 | Option 1 | 0.7 | £12k |

It can be seen that the DP technique is guaranteed to find the optimal set of non-dominated solutions every time. It is, however, limited in the granularity used to generate solutions. Highly granular requirements from the user (i.e. large numbers of cost bands) over a complex, large problem will require a large amount of computational resources and may take an intractable amount of time for the algorithm to complete.

The invention claimed is:

1. A method for maintaining a complex article comprising using a computer to perform the steps of;
   (a) taking a set of options for replacing each of a plurality of components of the complex article,
   (b) identifying an optimum solution set from the set of possible replacement options of step (a) that best satisfies a plurality of criteria, the step of identifying an optimum solution set comprising the step of evaluating a plurality of potential solutions from the set of possible options defined in step (a) against the plurality of criteria, and
   (c) implementing an optimum solution of the optimum solution set, wherein the criteria values for potential solutions comprise probability functions and the step of evaluating a potential solution comprises the step of calculating a measure of effectiveness (MOE) of the potential solution from the probability function of each criterion value and at least one associated user function defining the acceptability of said criterion wherein each option for replacing a component is assessed against a plurality of criteria and wherein said plurality of criteria comprise at least one cost criteria and at least one benefit criteria.

2. A method according to claim 1 that comprises the step of using a Bayesian Belief Network (BBN) to model said plurality of criteria, said BBN being arranged to provide the criteria values for said potential solutions.

3. A method according to claim 2 wherein criteria values are determined by the BBN for each of the component replacement options prior to step (b).

4. A method according to claim 1 wherein the step of calculating a measure of effectiveness (MOE) comprises the step of taking at least one predetermined user function for each criterion.

5. A method according to claim 1 wherein the step of calculating a measure of effectiveness (MOE) comprises the step of taking two or more predetermined user functions for each criterion.

6. A method according to claim 1 wherein the step of calculating a measure of effectiveness (MOE) of a potential solution comprises the step of calculating a single, overall, MOE value.

7. A method according to claim 1 wherein the step of calculating a measure of effectiveness (MOE) of a potential solution comprises the step of calculating at least first and second MOE values.

8. A method according to claim 1 wherein the optimum solution set of step (b) comprises the Pareto set of optimal solutions.

9. A method according to claim 1 wherein step (b) comprises the step of using an optimisation process to determine the optimum solution set.

10. A method according to claim 9 wherein the optimisation process comprises the step of using an Evolutionary Algorithm.

11. A method according to claim 10 wherein said evolutionary algorithm comprises a genetic algorithm.

12. A method according to claim 9 wherein the optimisation process comprises the step of using a dynamic programming technique.

13. A method according to claim 1 wherein the set of options for replacing each of a plurality of components of the complex article comprises at least one option for dealing with component obsolescence arisings (OAs).

14. A method according to claim 1 wherein the possible options taken in step (a) are derived from a hierarchical description of the components forming the complex article.

15. A method according to claim 1 wherein the method is applied to maintain a complex article at a desired operational performance level.

16. A method according to claim 1 wherein steps (a) and (b) are implemented using a suitably programmed computer.

17. A computer readable non-transitory medium including a computer program comprising instructions for causing a device to execute a method that comprises the steps of;
(a) taking a set of options for replacing each of a plurality of components of a complex article,
(b) identifying an optimum solution set from the set of possible replacement options of step (a) that best satisfies a plurality of criteria, the step of identifying an optimum solution set comprising the step of evaluating a plurality of potential solutions from the set of possible options defined in step (a) against the plurality of criteria, and
(c) providing an output that lists the solution(s) contained in the optimum solution set identified in step (b), wherein the criteria values for potential solutions comprise probability functions and the step of evaluating a potential solution comprises the step of calculating a measure of effectiveness (MOE) of the potential solution from the probability function of each criterion value and at least one associated user function defining the acceptability of said criterion wherein each option for replacing a component is assessed against a plurality of criteria and wherein said plurality of criteria comprise at least one cost criteria and at least one benefit criteria.

18. A computer program according to claim 17 wherein step (b) comprises the step of using an optimisation process.

19. A computer programmed so as to execute the computer program of claim 17.

20. A method of solving a complex problem to satisfy a plurality of criteria, the method comprising the steps of;
(i) taking a potential solution to the problem,
(ii) assessing the potential solution to the problem against the plurality of criteria to derive criteria values, and
(iii) calculating a measure of effectiveness (MOE) of said potential solution from said criteria values, wherein step (ii) comprises the use of probabilistic criteria values wherein each option for replacing a component is assessed against a plurality of criteria and wherein said plurality of criteria comprise at least one cost criteria and at least one benefit criteria.

21. A method according to claim 20 wherein the method comprises an optimisation step to iteratively repeat steps (i) to (ii) to derive an optimum solution set based on the calculated measures of effectiveness.

22. A method according to claim 20 wherein the calculation of a measure of effectiveness (MOE) of step (iii) comprises the step of taking a user function that defines the acceptability of each of the criteria.

23. A method according to claim 20 wherein the decision making method is applied to at least one of financial planning, resource management, function approximation, investment, project prioritisation, capital/revenue budgeting, sales territory organisation and negotiations.

24. A computer readable medium having stored therein instructions for causing a device to execute the method according to claim 20.

25. A computer that is suitably programmed to execute the method according to claim 20.

* * * * *